United States Patent
Andrus et al.

[11] Patent Number: 6,129,260
[45] Date of Patent: Oct. 10, 2000

[54] SOLDERABLE STRUCTURES

[75] Inventors: Lance Andrus, Southboro, Mass.; James Fraivillig, Austin, Tex.; Edward Barrett, Revere, Mass.; Brian High, Londonderry, N.H.

[73] Assignee: Fravillig Technologies Company, Boston, Mass.

[21] Appl. No.: 09/136,846

[22] Filed: Aug. 19, 1998

[51] Int. Cl.[7] .......................... B23K 31/02; H05K 3/38
[52] U.S. Cl. .......................... 228/120; 228/193; 228/175
[58] Field of Search .................. 228/120, 193, 228/262.1, 175, 176

[56] References Cited

U.S. PATENT DOCUMENTS

| | | | |
|---|---|---|---|
| 4,172,547 | 10/1979 | DelGrande | 228/121 |
| 4,315,591 | 2/1982 | Houston | 228/188 |
| 4,327,124 | 4/1982 | Desmairais | 427/96 |
| 5,151,776 | 9/1992 | Wojnarowski et al. | 357/81 |
| 5,460,318 | 10/1995 | Boudreau et al. | 228/123.1 |
| 5,532,512 | 7/1996 | Fillion et al. | 257/686 |
| 5,607,538 | 3/1997 | Cooke | 156/291 |
| 5,637,925 | 6/1997 | Ludden et al. | 257/774 |
| 5,650,593 | 7/1997 | McMillan et al. | 174/52.4 |
| 5,691,567 | 11/1997 | Lo et al. | 257/675 |
| 5,745,344 | 4/1998 | Baska et al. | 361/705 |
| 5,759,269 | 6/1998 | Cutting et al. | 118/213 |
| 5,773,362 | 6/1998 | Tonti et al. | 438/665 |
| 5,798,171 | 8/1998 | Olson | 428/220 |
| 5,814,174 | 9/1998 | Fong | 156/94 |
| 5,931,222 | 8/1999 | Toy et al. | 165/80.3 |
| 5,969,945 | 10/1999 | Cutting et al. | 361/704 |

OTHER PUBLICATIONS

Patent Cooperation Treaty, International Search Report, International Application No. PCT/US99/19099, mailed on Dec. 21, 1999, 6 pages.

1996 Annual Report, VICOR Corporation, Andover, MA, Apr. 1997.

*Primary Examiner*—Patrick Ryan
*Assistant Examiner*—Jonathan Johnson
*Attorney, Agent, or Firm*—Testa, Hurwitz & Thibeault, LLP

[57] ABSTRACT

Solderable structures, and related methods for making them, can provide thermal conductivity and/or electrical isolation for electronic devices soldered to the structures. Each of the structures includes a solderable material bonded to a heat sink by a thermally-activated bonding material which provides thermal conductivity between the solderable material and the heat sink and which can be configured as a three-layer bonding film to also provide electrical isolation. The structures can be produced in a highly-automated, rapid way without the need for standard mounting hardware and mechanical preparation of the heat sinks.

32 Claims, 9 Drawing Sheets

SOLDERABLE STRUCTURES

TECHNICAL FIELD

The invention relates generally to solderable structures and related methods. Various electronic devices can be soldered to the structures.

BACKGROUND INFORMATION

Power semiconductors typically generate significant heat during operation. In order to ensure efficient operation and avoid failure, some form of cooling or heat sinking is usually provided. Heat sinking usually involves mechanically mounting the semiconductor device to an aluminum heat sink. The efficiency of the heat sink is generally dependent on the pressure exerted on the semiconductor device by the mounting hardware. A heat transfer aid, such as thermal grease (e.g., ceramic-loaded grease), is often used to displace the air between the component and the heat sink with a more thermally-conductive material (the grease), but the application of the grease can be messy. Silicone-based grease can be used, however silicone migration can occur in the electrical circuit.

High voltage and high power semiconductor devices can require electrical isolation from the heat sink to prevent shorting. These devices typically require sufficient thermal coupling to the heat sink to allow proper operation. A thin conformable electrically-insulating pad or layer is often sandwiched between the device and the heat sink during the mounting procedure. Such a mounting procedure typically is done manually and is quite time consuming. The manual mounting of the layer generally prevents rapid, automated production.

A nut and bolt attachment is commonly used to secure the device to the heat sink, however, there are many problems with this type of attachment. If the torque used to fasten the device to the heat sink is too small, the thermal transfer capability is degraded. If the torque is too great, however, the semiconductor can lift the device up from the heat sink at the end of the device opposite the nut and bolt and the thermal transfer capability is degraded.

Other problems include the inconsistency in thermal transfer rate between similarly mounted devices due to variability in the integrity of the individual mounting as well as variations in the materials used between the heat sink and the semiconductor device. In addition, a variety of small parts must be maintained in inventory. Also, these mechanical mounting techniques usually require significant manual labor. A hole must be pre-drilled into the heat sink to accept the bolt. Moreover, the nut and/or bolt can protrude to create packaging design issues.

SUMMARY OF THE INVENTION

The present invention relates to a solderable structure and a method of making the solderable structure. The invention also relates to a machine for making the solderable structure. The solderable structure has applications in heat sinking of various electronic devices such as power semiconductor devices. The structures created by the method can provide excellent thermal conductivity and/or electrical isolation for electronic devices soldered to the structures. The method is suitable for highly-automated and rapid production of the structures with yields having uniform thermal transfer characteristics. The method and structures are scaleable and can be customized for a range of requirements. The resulting structures do not require obtrusive mounting hardware (e.g., nuts and bolts) and no modification to the heat sink (e.g., the drilling of bolt holes) is necessary.

In one aspect, the invention features a method for creating a solderable structure. The method includes providing a heat sink, a solderable material, and a thermally-activated bonding material. The method also includes applying heat to the heat sink to raise its temperature, and placing the solderable material onto the heated heat sink with the bonding material interposed between the heat sink and the solderable material such that the bonding material is activated by the heat and a "tack bond" results between the heat sink and the solderable material. The method can also include, after disposing the solderable material onto the heat sink, the step of pressing the solderable material and the heat sink together with the bonding material interposed to create the solderable structure in which the bonding material firmly bonds the solderable material to the heat sink. The pressing can be done while applying heat, and can be followed by the step of soldering a power semiconductor device to the solderable material.

The bonding material preferably includes thermoplastic polyimide (although other bonding materials can be used), and it can be provided as a coating on the solderable material which can be copper. The bonding material also preferably is thermally-conductive to allow heat to be dissipated from the solderable material to the heat sink. The heat sink typically is an unsolderable material such as aluminum, and it can be treated to prevent oxidation. In one embodiment, the thermally-activated bonding material is provided as two layers, one on either side of a dielectric material to create a three-layer bonding film. The three-layer bonding film can be provided as a film on one side of the solderable material. The bonding film preferably is electrically isolating and thermally-conductive such that heat, but not electrical current, can flow from the solderable material to the heat sink.

In another aspect, the invention relates to a structure including a heat sink, a solderable material, and a single layer of thermally-activated bonding material disposed between the heat sink and the solderable material. The single layer bonding material bonds the solderable material to the heat sink. The bonding material can be provided as a coating on one side of the solderable material. In a disclosed embodiment, the coated solderable material is copper coated with thermoplastic polyimide. The heat sink can be aluminum (or any unsolderable material). The aluminum heat sink can be treated to prevent oxidation. A power semiconductor device can be soldered to the solderable material of the structure. The bonding material can be provided as a three-layer, electrically-isolating, thermally-conductive film, as described above.

In yet another aspect, the invention also involves a machine for creating solderable structures such as those described above. The machine includes a heater mechanism for heating a heat sink and a placement mechanism for placing a solderable material, with a thermally-activated bonding material coating, onto the heated heat sink. When the placement mechanism places the coated solderable material onto the heated heat sink, the bonding material creates a "tack bond" which is strong enough to hold the solderable material in place as positioned on the heated heat sink. The placement mechanism preferably includes a robotic arm or a "pick and place" device. The machine can also include a press mechanism for pressing the solderable material and the heat sink together with the bonding material interposed to create a firm and permanent bond between the solderable material and the heat sink. The press mechanism can apply heat during the pressing step.

The method is well suited for rapid production of solderable structures by highly-automated machines. Time-consuming manual labor is thus avoided. The need for bulky and obtrusive mounting hardware is eliminated thus eliminating many design issues associated with conventional mounting techniques. Another benefit is the lack of mechanical preparation required for the heat sink. In addition, the use of heat transfer aids (e.g., thermal grease) is avoided.

Tack bonding allows the fabrication of the structures to be done quickly and with accurate placement. Pads of material (e.g., solderable material, solderable material coated with bonding material, and/or dielectric material coated on both sides with bonding material) are secured in place upon contact. No additional time is required to ensure that the pads will remain in place before the structure is picked up and placed at a different location for additional processing. The result can be a significant cost per unit reduction when compared with the fabrication of conventional heat sinks for electronic devices.

BRIEF DESCRIPTION OF THE DRAWINGS

The foregoing and other objects, features and advantages of the invention will become apparent from the following more particular description of embodiments of the invention, as illustrated in the accompanying drawings. The drawings are not necessarily to scale, emphasis instead being placed on illustrating the principles of the present invention.

DESCRIPTION

Figure 1:
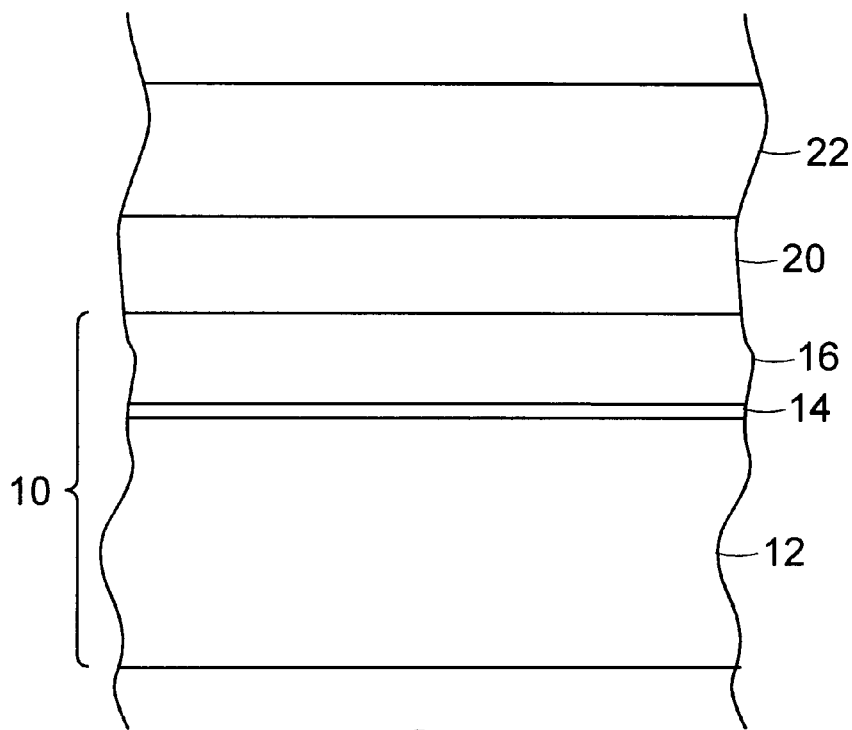
FIG. 1 is a cross-sectional view of a portion of a semiconductor device soldered to a thermally-conductive solderable structure according to the invention.

Referring to FIG. 1, a thermally-conductive solderable structure 10 according to the invention has a device 22 fixed thereon by solder 20. The solderable structure 10 includes a heat sink 12, a thermally-activated bonding material 14, and a solderable material 16. The heat sink 12 serves as a thermal mass to dissipate heat generated by the device 22 which can be a power semiconductor or other heat-generating component.

Figure 2:
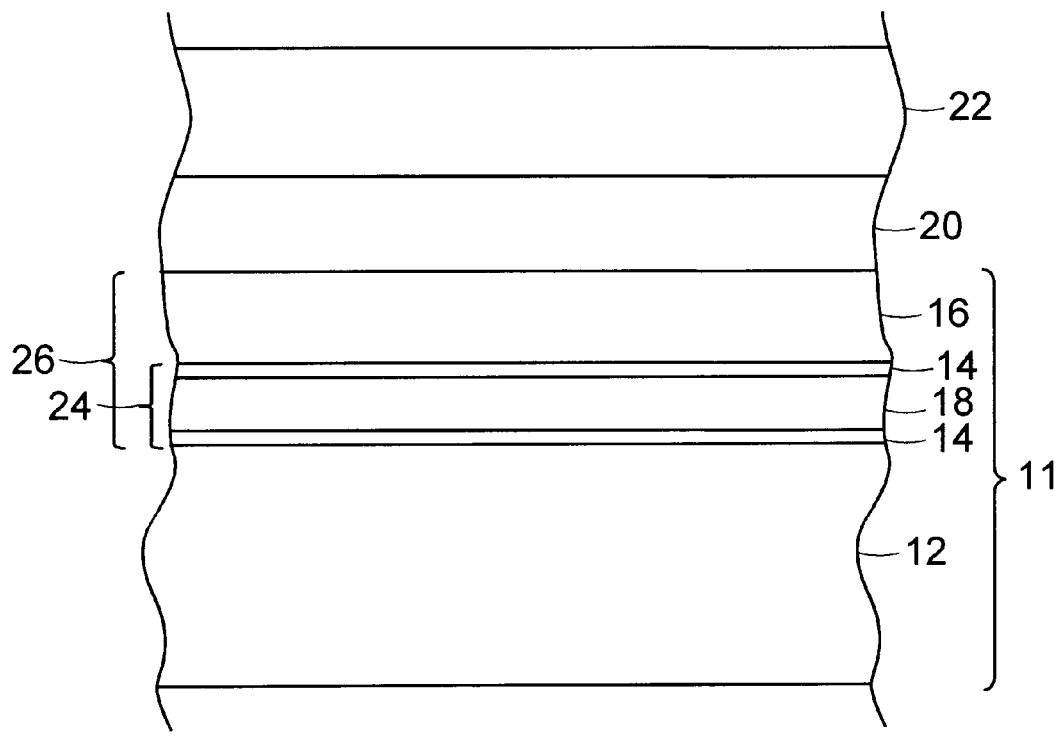
FIG. 2 is cross-sectional view of a portion of a semiconductor device soldered to an electrically-insulating and thermally-conductive solderable structure according to the invention.

Referring to FIG. 2, an electrically-insulating and thermally-conductive solderable structure 11 according to the invention has the device 22 fixed thereon by the solder 20. The structure 11 is similar to the structure 10 of FIG. 1 except for a dielectric layer 18 and an additional layer of thermally-activated bonding material 14. The dielectric layer 18 is preferably Kapton MT polyimide film which can withstand 4 kilovolts across a 0.001 in. thick layer. Alternatively, polyethylene naphthalate, polyethylene terethalate, and/or mylar can be used as the material for the dielectric layer 18. Other materials or combinations of materials are possible for the layer 18 as long as the layer 18 is substantially electrically-insulating. The dielectric layer 18 can be provided with a pre-applied coating of thermally-activated polyimide adhesive 14 on each surface, thus creating a three-layer film 24. The film is cut or punched to a size slightly larger than the solderable area of the surface 28 to ensure electrical isolation of the device 22 from the heat sink 12. Alternatively, a four-layer film 26 including the layer of polyimide adhesive 14, the dielectric layer 18, the second layer of polyimide adhesive 14, and the solderable material 16 can be used.

In either embodiment of the structure 10,11 according to the invention, the heat sink 12 typically is made from a material which does not allow direct soldering of components. That is, solder will not adhere to the heat sink 12 as it is typically made of aluminum or other non-solderable material. The heat sink 12 can be formed in a variety of geometries for improving thermal performance. Typically, the heat sinks 12 are stamped from stock or are extruded, and they may be processed to minimize oxidation (e.g., anodized). The size and material of the heat sink 12 generally depends on the required operational characteristics of the device 22. Aluminum is preferred for many applications due to its thermal transfer characteristics, processability, and cost. Copper or ceramics such as aluminum oxide, beryllium oxide, and porcelain can also be used.

For the embodiment of FIG. 1, the thermally-activated bonding material 14 bonds the solderable material 16 to the heat sink 12. A thermoplastic polyimide adhesive is preferred for the bonding material 14 because it provides a fast activating bond at a temperature above its glass transition temperature and it maintains physical properties sufficient to endure solder reflow and thermal cycling typically encountered in the making and testing of electronics. The thickness of the adhesive 14 necessary for bonding the solderable material 16 to the heat sink 12 is small, typically only three to five microns, and results in an efficient heat transfer between the solderable material 16 and the heat sink 12. The length and width of the adhesive 14 is typically slightly larger than the surface of the device.

The solderable material 16 can be copper, and it can be provided as electro-deposited (ED) electronics-grade copper foil. In the disclosed embodiment, the matte side of the copper foil is treated to improve adhesion (e.g., zinc plating) and the other side is treated (e.g., zinc chromate treatment) to prevent oxidation which can be problematic during high-temperature lamination. The bonding material 14 can be formed (e.g., coated) on the matte side of the copper foil 16 to simplify the manufacturing process. Ideally, the bonding material 14 is applied using a gravure roll coating technique to achieve superior thickness uniformity although other coating techniques can be employed. The copper foil 16 can be provided in rolls which can be cut or punched to provide pads of the proper size for use in the structure 10. Each pad of copper foil 16 (with the bonding material 14 on one side thereof) is placed at a predetermined position on a pre-heated heat sink 12 to achieve a tack bond. The "sandwich" of the copper pad 16 and the heat sink 12 with the bonding material 14 disposed therebetween is then pressed at high temperature and high pressure to ensure a high quality bond with no air entrapped between the heat sink 12 and copper foil 16. The solderable structure 10 is thus formed.

The solder 20 (in the form of, for example, a quantity of solder paste) is applied to the top side of the copper foil 16, i.e., the side opposite that of the bonding material 14. A solder paste 20 with minimal volatiles is preferred. As the temperature of the structure 10 is increased, volatiles are driven from the solder paste 20 and the solder 20 reflows. The copper foil 16 and a solderable surface of the device 22 are brought into close proximity, ideally leaving a small gap typically 0.003 in. wide. The gap is filled with the reflowed solder by capillary action. Once the gap has been filled, the application of heat ceases and cooling begins. Cooling can include application of an ambient air flow or a cooling liquid. Alternatively, a cold plate can be placed in thermal contact with the structure 10 to remove heat quickly. When the temperature of the structure 10 drops below the reflow temperature of the solder 20, the assembly is complete and the structure 10 now has the device 22 fixed thereon.

Some power semiconductors do not require electrical insulation from the heat sink 12 because of their low voltage or power characteristics. High voltage and high power semiconductors, however, require electrical isolation to prevent electrical shorts while maintaining sufficient thermal dissipation. Referring now again to FIG. 2, the structure 11 provides the electrical isolation required by such high voltage and high power devices Each pad of the multi-layered film 24 or 26 is placed at the desired position on a pre-heated heat sink 12 and thus tack-bonded. The pad is then pressed at high temperature and high pressure to ensure a high quality bond with no air entrapped between any of the layers. The solderable structure 11 is thus formed.

Figure 3:
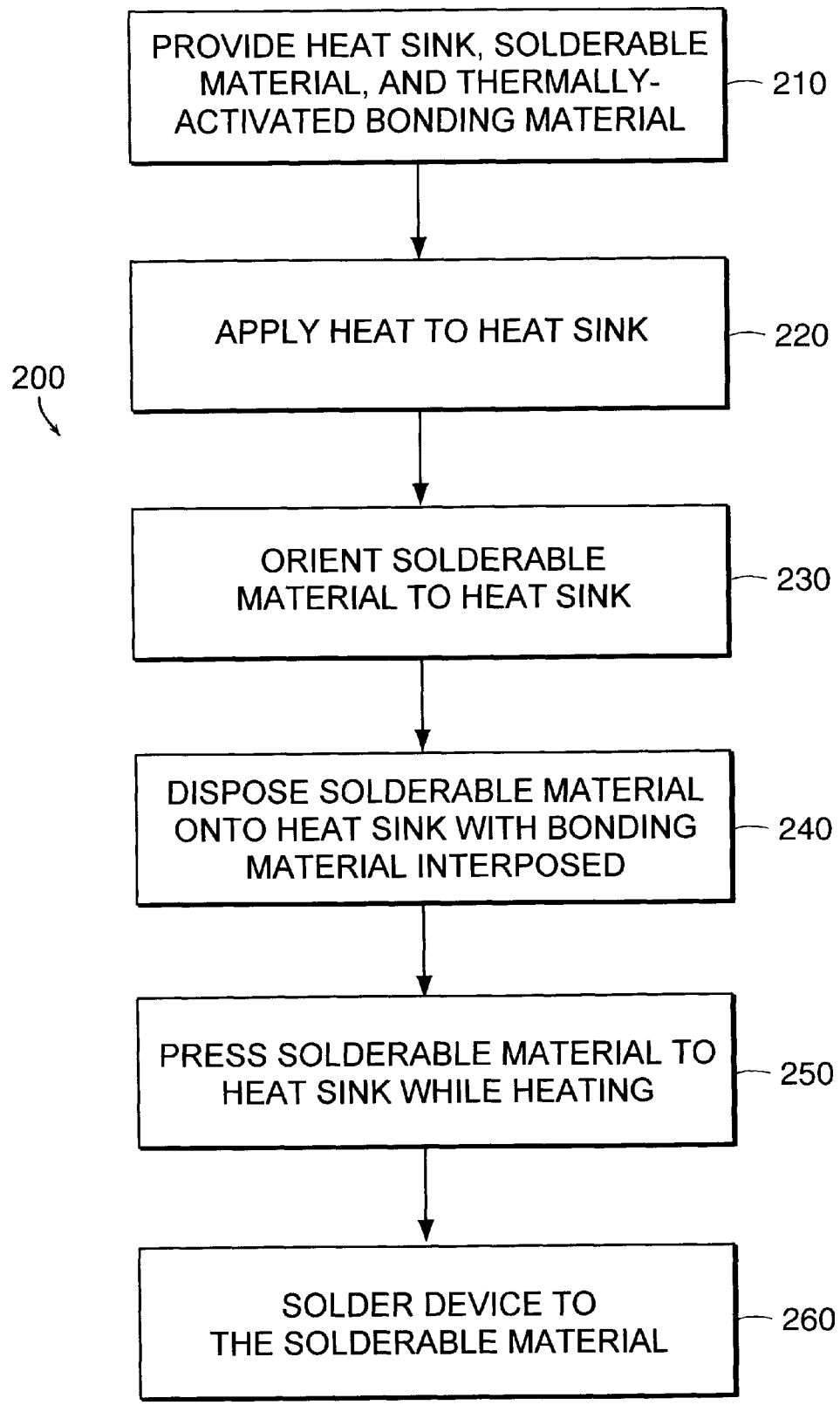
FIG. 3 is a flowchart of a method for making a solderable structure according to the invention.

A flowchart 200 describing steps for producing a solderable structure 10,11 according to the invention is shown in FIG. 3. In step 210, the heat sink 12, the solderable material 16, and the thermally-activated bonding material 14 are provided. The heat sink 12 can be any structure providing sufficient thermal mass to dissipate heat generated in the device 22 to be soldered to the structure 10,11. The heat sink 12 typically is made from material which is not directly solderable (e.g., aluminum). In step 220, heat is applied to the heat sink 12 to raise its temperature to well above the glass transition temperature of the bonding material 14 to permit fast tack-bonding. Heat can be applied to the heat sink 12 in a variety of ways. For example, the heat sink 12 can be heated by placing it in contact with a hot plate or by using a hot air jet that impinges on the heat sink 12. Other methods of applying heat are acceptable as long as the heat sink temperature is adequately controlled and raised to an acceptable temperature.

In step 230, the solderable material 16 (e.g., a piece of copper foil) is oriented with respect to the heated heat sink 12. This step (230) can include orienting the thermally-activated bonding material 14 at the same time. That is, in one disclosed embodiment, the bonding material 14 is supplied as a layer, coating or film on one side of the solderable material 16. For example, a thermoplastic polyimide adhesive film can be applied to one side of the piece of copper foil. In step 240, the solderable 16 is placed onto the pre-heated heat sink 12 with the bonding material 14 interposed to achieve a tack bond. Orientation and placement of the materials can be accomplished with a robot, or a dedicated rotary or linear machine customized for these tasks. In step 250, the solderable material 16 is pressed to the heat sink 12 at an elevated temperature (well beyond the glass transition temperature of the bonding material 14) and at high pressure to ensure a quality bond between the various layers. In particular, air entrapped between the layers is forced out, thereby improving thermal conductivity between the layers.

This manufacturing method can also include the step 260 of soldering a device 22 (e.g., a power semiconductor device) to the solderable material 16. This can be accomplished by inserting solder paste between the base of the device 22 and the solderable material 16, and heating the structure 10,11 until the solder reflows. At this time, the device 22 is placed near the surface of the solderable material 16 to create a narrow gap so that the solder wicks into the gap. The heat source is then removed from the structure 10,11 and the solder cools so that it no longer flows.

The manufacturing method also includes steps for producing an electrically-insulating and thermally-conductive structure 11 which are similar to the steps for producing the thermally-conductive structure 10 described above. In step 210, however, the thermally-activated bonding material 14 is provided as a three-layer bonding film which comprises a dielectric material disposed between two layers of the bonding material. In step 230, the orienting of the solderable material 16 includes placing the three-layer film on the heated heat sink 12. Step 240 then includes placing the solderable material 16 onto the three-layer film such that the solderable material 16 is tack-bonded to the heat sink 12.

Figure 4A:
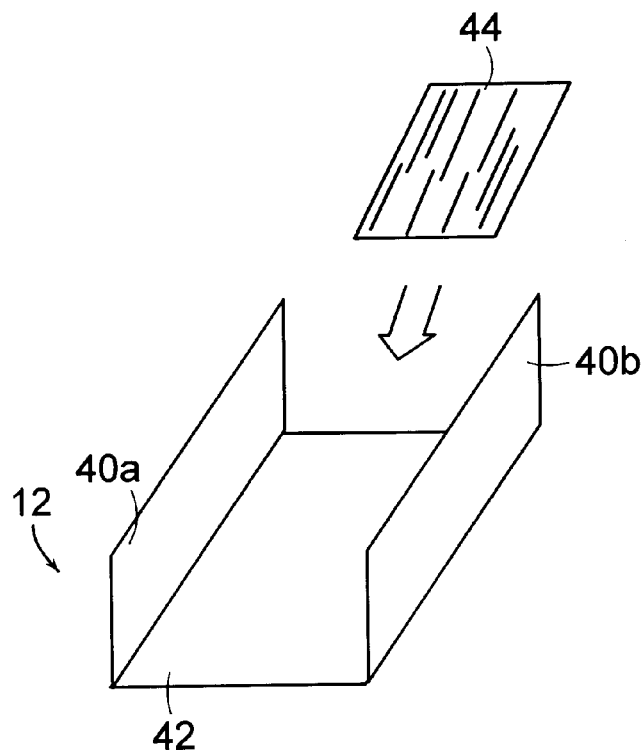
FIGS. 4A and 4B show the making of a thermally-conductive solderable structure according to the invention.
Figure 4B:
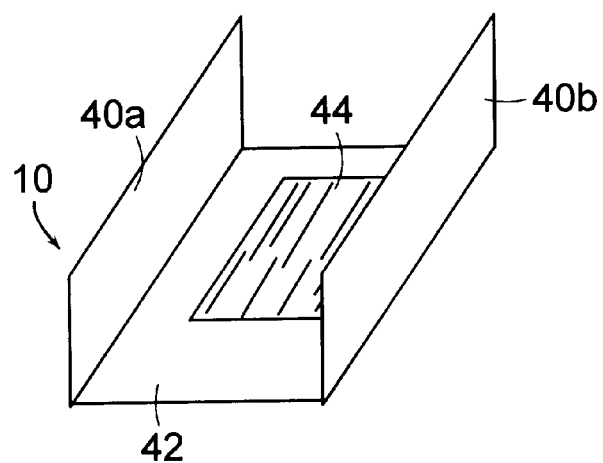

Referring to FIGS. 4A and 4B, the solderable structure 10, which is thermally-conductive but not electrically isolating, thus is constructed and can appear as follows. The heat sink 12 can include a pair of sides 40a and 40b, and a mounting surface 42 for mounting and heat sinking of one or more of the devices 22. The sides 40a,40b can be formed to include additional surface area (not shown) to provide more efficient cooling of the semiconductor device 22. The sides 40a,40b can also be formed to include features based on mechanical design requirements. A pad 44 includes a two-layered film comprising thermally-activated polyimide material 14 deposited on one side of a copper foil 16 (i.e., adjacent layers 14 and 16 in FIG. 1). The heat sink 12 is heated to a temperature above the glass transition temperature of the polyimide material 14 and the pad 44 is tack-bonded at a predetermined location on the mounting surface 42, resulting in the solderable structure 10 shown in FIG. 4B. The tack bond can be made permanent by applying pressure as described previously and hereafter.

Figure 5A:
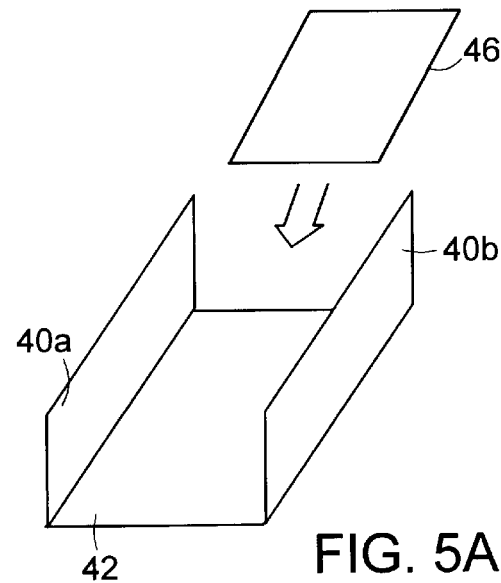
FIGS. 5A–5C show the making of an electrically-insulating and thermally-conductive solderable structure according to the invention.
Figure 5B:
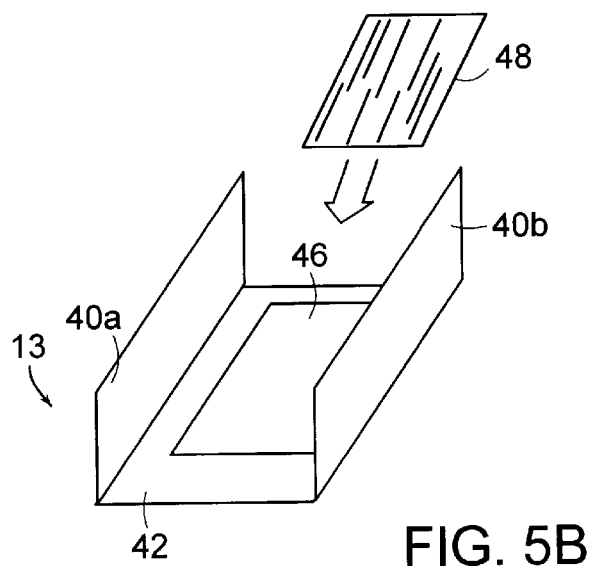
Figure 5C:
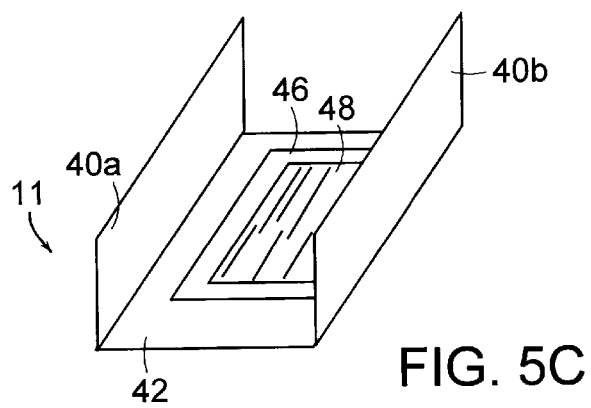

Referring to FIGS. 5A–5C, the solderable structure 11, (FIG. 5C) which is thermally-conductive and electrically isolating, thus is constructed and can appear as follows. The heat sink 12 is prepared to receive an electrically-insulating pad 46 for mounting and heat sinking of power semiconductor devices 22. The electrically-insulating pad 46 is a three-layer construct which includes a dielectric sheet 18 (e.g., Kapton MT) sandwiched by two layers of thermally-activated polyimide material 14 (i.e., adjacent layers 14, 18 and 14 in FIG. 2). The heat sink 12 is heated to a temperature above the glass transition temperature of the polyimide material 14 and the electrically-insulating pad 46 is then tack-bonded at a predetermined location on the mounting surface 42, resulting in the intermediate structure 13 shown in FIG. 5B. A solderable pad 48 of electro-deposited (ED) electronics-grade copper foil is then tack bonded to the electrically-insulating pad 46, resulting in the solderable structure 11 in FIG. 5C. The tack bond can be made permanent by applying pressure as described previously and hereafter. The electrically-insulating pad 46 is slightly larger than the solderable pad 48 to ensure that the base of the solderable device 22 does not contact the heat sink 12 and create an electrical short.

Figure 6A:
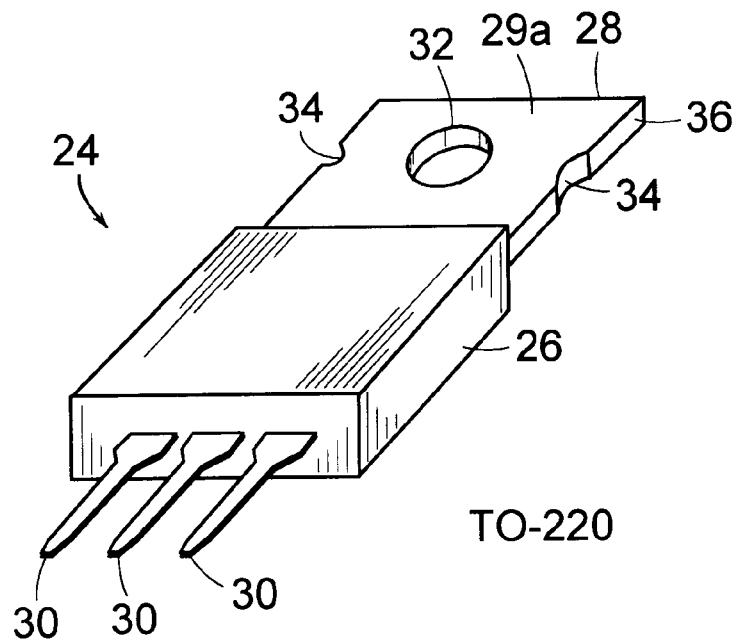
FIGS. 6A and 6B show top and bottom perspective views, respectively, of a TO-220 semiconductor device package which can be soldered onto a solderable structure to create soldered systems according to the invention.
Figure 6B:
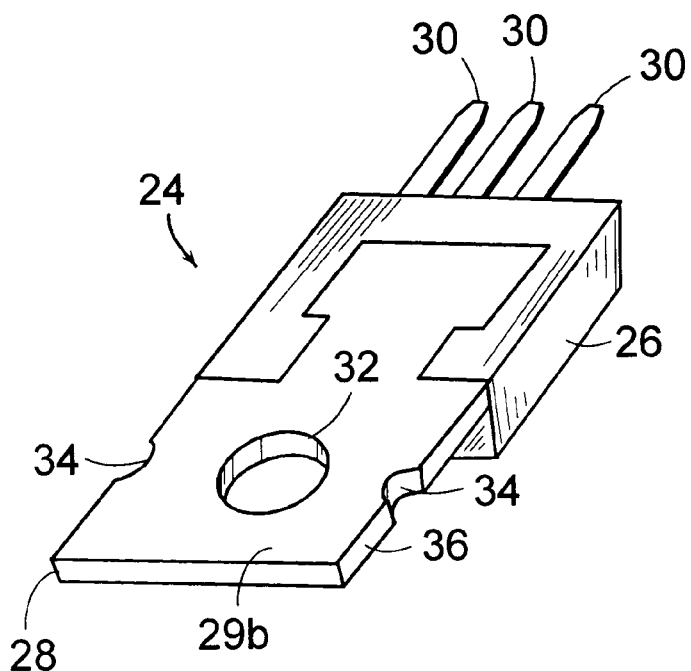

One example of a device 22 capable of mounting to a solderable structure 10,11 is shown as a TO-220 semiconductor device package 24 in the top perspective view of FIG. 6A. The package 24 is a standardized configuration which includes a molded plastic body 26, a mounting flange 28, and leads 30 for connection to external circuitry. The flange 28 includes a top surface 29a, a bottom surface 29b, (FIG. 6B) a pair of depressed edges 34 in the flange wall 36, and a circular aperture 32 for receiving a bolt (not shown) for mounting to the heat sink 12 (not shown in FIG. 6A or FIG. 6B). If the bolt is used for mounting, a tapped hole to receive the bolt is required in the heat sink 12 (not shown in FIG. 6A or FIG. 6B). The flange 28 is typically copper and can be coated with a material to facilitate soldering to the heat sink 12 (not shown in FIG. 6A or FIG. 6B). Referring to FIG. 6B, the bottom surface 29b of the flange 28 can be soldered to the solderable material 16 (not shown in FIG. 6A or FIG. 6B) to allow heat sinking.

Figure 7:
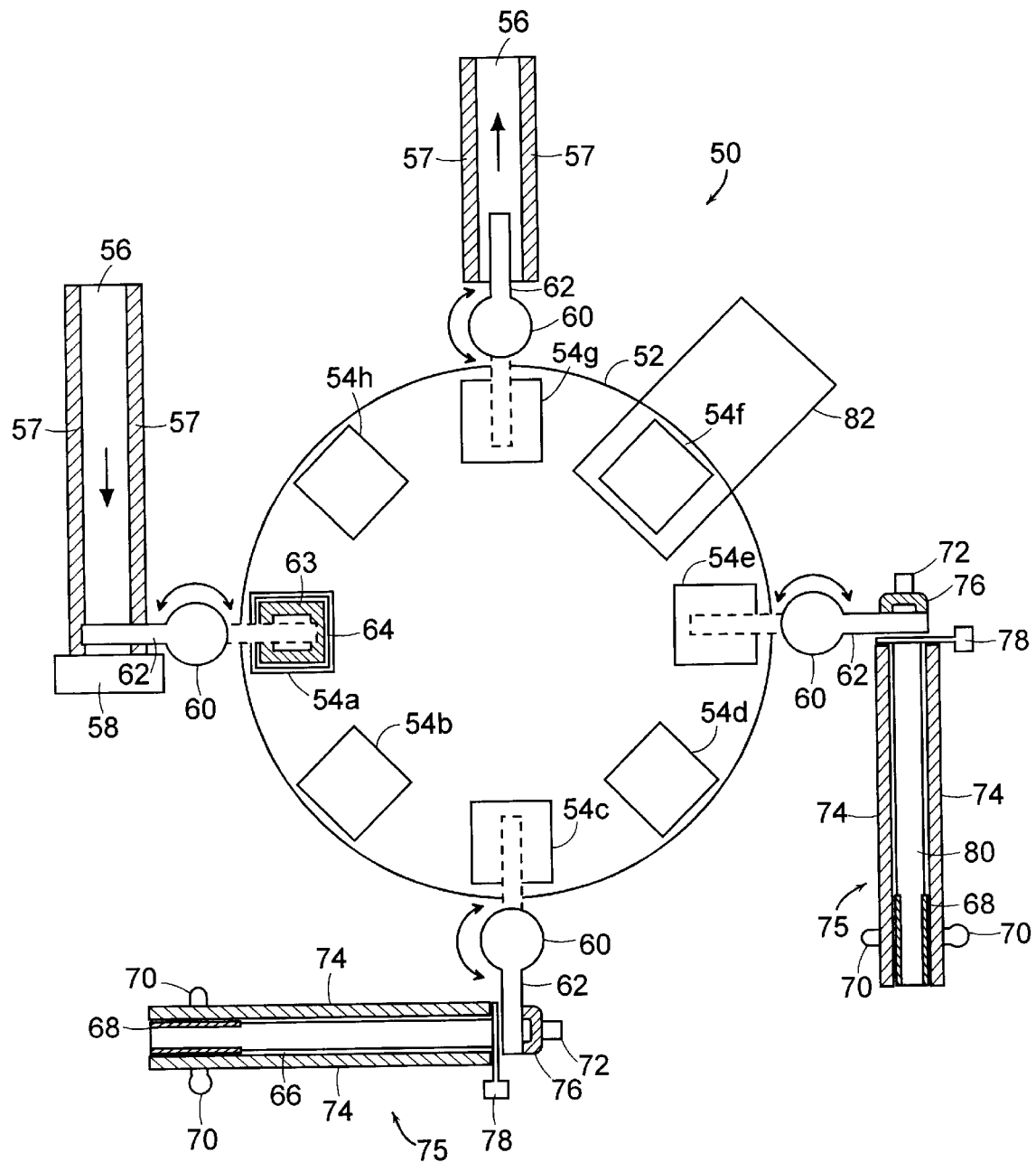
FIG. 7 is an illustration of a dial machine for automated production of solderable structures.

Referring to FIG. 7, the invention also relates to a dial machine 50 for rapid automated construction of a solderable structure 10,11. The machine 50 includes a rotary table 52 having station positions 54 at which various tasks are performed on the heat sink 12. The rotary table 52 is rotationally indexed at regular intervals so that each structure 10,11 under construction is moved sequentially through all stations 54a–54g before completion of assembly. The machine 50 utilizes common components for common tasks, thus reducing hardware integration time, reducing the replacement part inventory, and lowering the cost per unit. The table has a diameter of approximately 16 in. and can accommodate structures 10,11 with bond areas up to 2 in.×2 in. for processes utilizing up to eight stations. The dial machine 50 is ideal for automated production of large quantities of structures 10,11. A completed structure 10,11 can be produced rapidly (e.g., 70 seconds). In addition, the machine 50 processes several structures at once, thus the output of the machine can be high (e.g., one structure every 10 seconds).

Operation of the dial machine 50 can best be understood by following the processing of an unprocessed heat sink 12 through to a completed structure 10,11. The heat sink 12 is provided to the rotary machine 50 by a conveyor 56. The conveyor 56 (e.g., vibratory unit by Arizona Gear & Mfg. Co. and vibrator model no. TDS-062 by USVibra, Inc.) can be any conveying mechanism capable of transporting the heat sink 12 from a supply location to the rotary table 52. Guides 57 can be used to restrict the lateral position of the heat sink 12 as it travels along the conveyor 56. The heat sink 12 is prevented from further travel when it reaches a stop 58 near one end of the conveyor 56.

A placement mechanism 60 is used to retrieve the heat sink 12 from the conveyor 56 at the stop 58 and place it at the first station 54a. The placement mechanism 60 shown is a rotary type "pick and place" (e.g., model no. MRQBS32-50CB by SMC) utilizing a pneumatically-operated arm 62. The arm 62 includes a vacuum inlet in a silicone cup (not shown) for lifting the heat sink 12 from the conveyor 56 when a vacuum is applied. The silicone cup is suitable for the high temperature of the structure 10,11 during processing. After lifting the heat sink 12, the arm 62 rises a distance sufficient to clear the conveyor 56, rotates 180°, and lowers the heat sink 12 into the first position 54a before releasing the heat sink 12 by interrupting the vacuum. Other devices, such as robotic arms, can also be used for picking and placing the heat sink 12. Each station 56a includes a frame 63 (shown only for the first position 56a) for receiving the heat sink 12. The opening in each frame 63 is slightly larger than the size of the heat sink 12. Frames 63 having different dimensions can be used if the machine 50 is converted to operate with a different size heat sink 12. Heat is applied to the heat sink 12 through a heater block 64 (shown only at the first station 54a) to raise the temperature of the heat sink 12 above the glass transition temperature of the thermally-activated bonding material 14. The heater block 64 is approximately 6 in.×6 in. and has one or more bores which house electrical cartridge heaters. In other embodiments of the machine, the temperature of the heat sink 12 can be increased by impinging a hot gas jet on the heater block 64. Also, other mechanisms for providing heat can be employed.

After a preset time interval (e.g., 10 seconds), generally determined by the station 54 requiring the longest processing time, the table 52 is rotated through a fixed angle (e.g., 45°) so that the heat sink is now positioned at the second station 54b. No functional tasks are performed at this station 54b (i.e., the heat sink 12 is in an idle position), however, the heater block 64 continues to heat the heat sink 12. Two other idle stations 54d,54h are also utilized solely for heating the heat sink 12.

After another preset time interval has expired, the table 52 is rotated so that the heat sink 12 is in the third station 54c. If the structure 10 to be fabricated is not electrically isolating, a pad (not shown) is cut from a two-layered film 66 of solderable material 16 (e.g., copper foil) coated with a layer of thermally-activated bonding material 14 (e.g., thermoplastic polyimide) and is tack bonded to the heat sink 12 in a predetermined position. If the structure 11 to be fabricated requires electrical isolation, the pad is cut from a threelayered film 66 of dielectric material 18 (e.g., Kapton MT) sandwiched between two layers of thermally-activated bonding material 14 (e.g., thermoplastic polyimide). The film 66, supplied on a reel 68, is transported to the third station 54c using a feeder mechanism 75. The feeder mechanism 75 includes a horizontal spindle 70 which supports and permits rotation of the reel 68. The film 66 is pulled by a gripper 72 along a path defined by two guide walls 74 and over a vacuum block 76 which holds the film 66 stationary while automated shears 78 cut off the pad of film 66 at the desired length. In other embodiments of the machine 50, a punch can be used to generate the desired size pad from the film 66. A pick and place mechanism 60 with arm 62 similar to the one used at the first station 54a is used to pick up the film pad (not shown) and tack bond it on the heated heat sink 12. After expiration of another time interval, the table 52 rotates so that the heat sink 12 is at the fourth station 54d (i.e., an idle position) where the heater block 64 continues to apply heat to it.

The table 52 is then rotated so that the heat sink 12 is at the fifth station 54e. If electrical isolation is not required for the structure 10 to be fabricated, no tack-bonding occurs at this station 54e. If an electrically isolated structure 11 is being fabricated, however, a pad of solderable material 16 (e.g., copper foil) is tack bonded to the three-layered film pad. The solderable material 16 is provided in the form of a film 80 on a reel 68 which is supported on and rotates about a spindle 70. The film 80 is pulled and cut by a feeder mechanism 75 similar to that used at the third station 54c. A pick and place mechanism 60 similar to the one at the third station 54c is used to place the pad of solderable material 16 onto the three-layered film pad.

The table 52 is then rotated so that the heat sink 12 is at the sixth station 54*f* where a press 82 (e.g., a hydraulic drawer press) is used for applying high pressure (e.g., greater than 300 p.s.i.) to compress the layers in the structure 10,11, thereby removing any air entrapped between the heat sink 12 and the solderable material 16. The structure 10,11 is heated to a high temperature (e.g., 175–245° C.) before the press engages the structure 10,11. The press 82 includes a press head (not shown) which translates horizontally until it is positioned over the position 54*f*. The press head then moves downward to engage the structure 10,11. After pressing is completed, the pressing surface is withdrawn from the structure 10,11 and translated away from the table 52.

The structure 10,11 is then rotated to the seventh station 54*g* where it is removed from the frame 62 and heater block 64 by a placement mechanism 60 similar to that used at the first, third and fifth stations 54*a*,54*c*,54*e*. The placement mechanism 60 places the structure 10,11 on a conveyor 56 which transports it to a location for collection or additional manufacturing tasks (e.g., soldering of a device 22 to the structure 10,11).

If the structure 10,11 is to include a soldered device 22, a quantity of solder 20 is applied to the exposed side of the solderable material 16. A placement mechanism 60 similar to those previously described is used to place the device 22 in close proximity (e.g., 0.003 in.) to the solderable surface 16 of the structure. The temperature of the structure 10,11 is increased beyond the reflow temperature of the solder 20 so that the solder wicks into the gap between the solderable material 16 and the device 22. The structure 10,11 is then cooled while the device 22 is held in its position with the placement mechanism. When the temperature of the structure 10,11 drops below the reflow temperature of the solder 20, the placement mechanism 60 releases the device 22 and the soldered structure 10,11 is now complete. The soldering of the device can be performed at an additional station (not shown) on the dial machine 50 or performed at a remote location.

Figure 8:
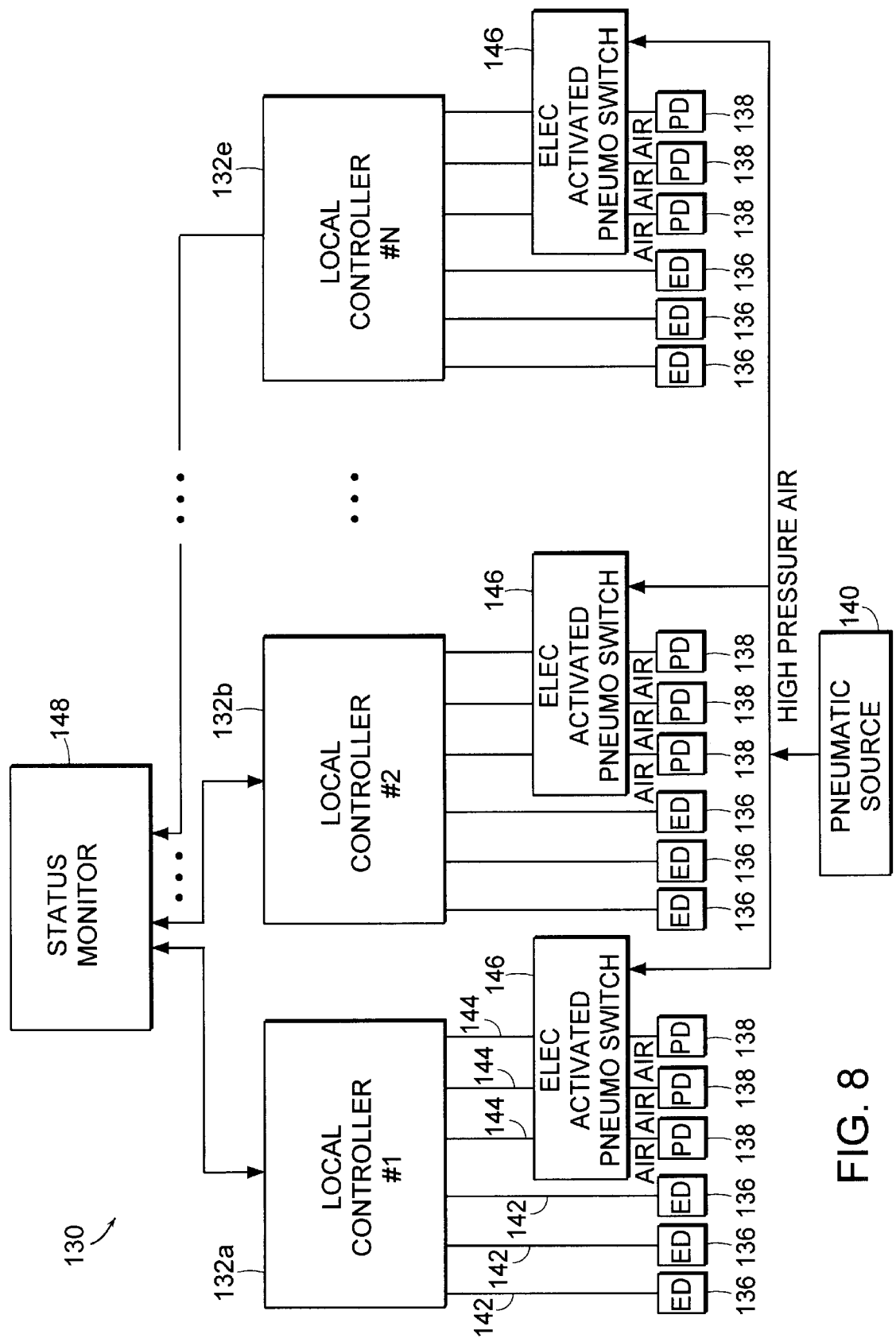
FIG. 8 is a functional block diagram of a control system for use with the dial machine of FIG. 7.

FIG. 8 shows a functional block diagram of a dial machine control system 130. The machine 50 is controlled by a set of local controllers 132 (e.g., Parallax BASIC Stamp II microcontrollers). Each local controller 132 interfaces to electrical devices 136 and pneumatic devices 138 for controlling various tasks performed by the machine 50. For example, controller #1 132*a* is used to control tasks implemented in the first active position 54*a*, including operation of the placement mechanism 60, actuation of the heater block 64, and synchronization of tasks with table rotation. Four more controllers 132*b* through 132 e are used for controlling tasks performed at the other four actives positions 54*c*,54*e*,54*f*,54*g*.

The electrical devices 136 are powered by an electrical power source (not shown) and the pneumatic devices 138 are powered by a pneumatic source 140 (e.g., an air pump). Electrical control lines 142 from the controller 132 provide enable and control signals (e.g., TTL signals) directly to the electrical devices 136. Pneumatic control lines 144 allow the controllers 132 to communicate with electrically-activated pneumatic switches 146 (e.g., relays and/or solenoids). These switches 146 are used to enable or interrupt high pressure air for operation of the pneumatic devices 138. A status monitor 148 (e.g., a STAMP II) communicates with each controller 132 to verify system health and to coordinate activities of the individual controllers 132. The status monitor 148 terminates operation of the dial machine 50 when system health parameters exceed acceptable ranges.

Figure 9:
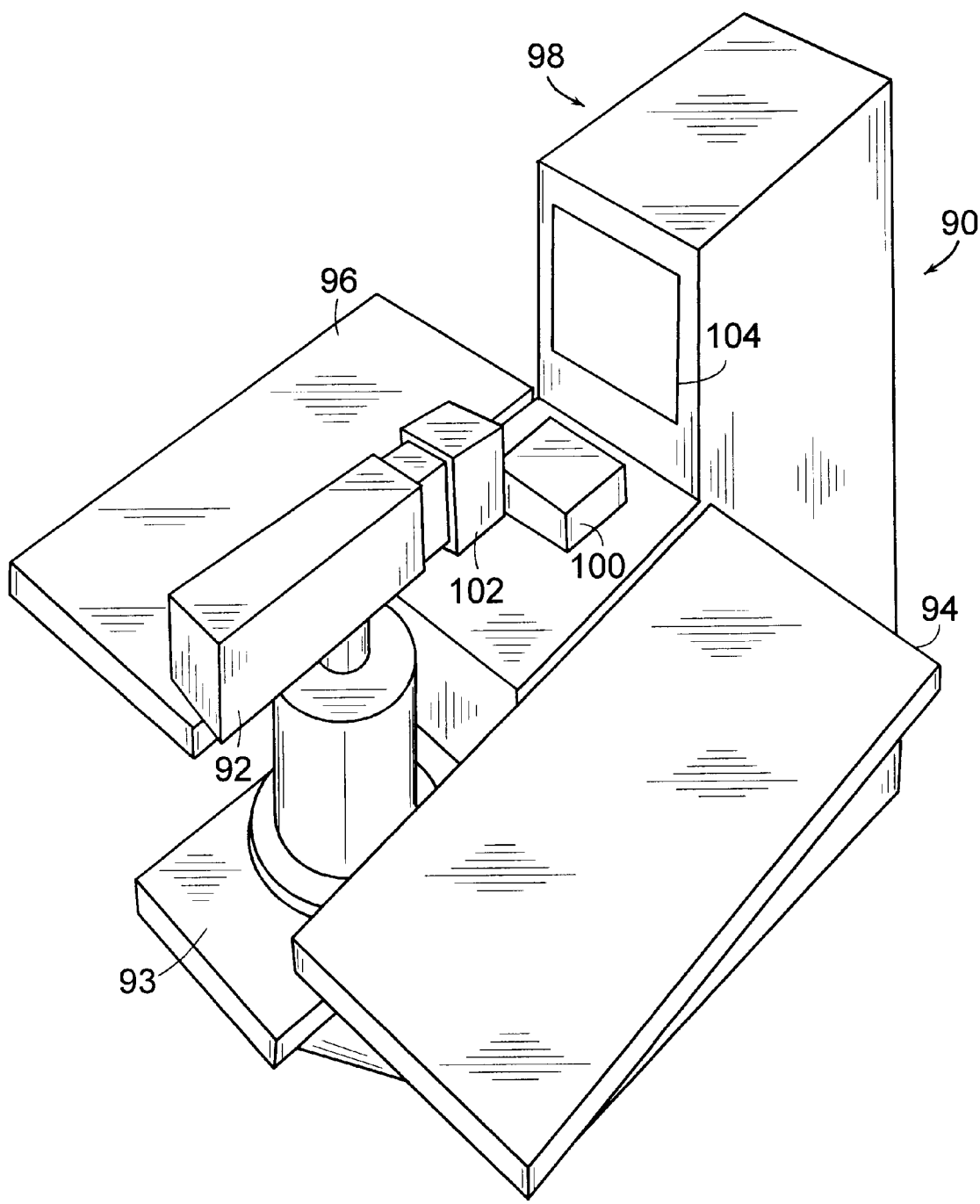
FIG. 9 is a perspective view of a robot-based machine for automated production of soldered systems.

Referring to FIG. 9, a robot-based machine 90 includes a robotic device 92 (e.g., a Seiko RT-3200 4-axis robot) on a base 93, a first table 94, a second table 96, a drawer press 98, and a processing platform 100. This machine 90 can provide the same processing capability as the faster dial machine 50. The machine 90 includes a control system (not shown) similar to that shown in FIG. 8 for the dial machine 50 where multiple local controllers 132 are devoted to a particular group of devices 136,138 for performing processing tasks. Alternatively, the robot 92 is controlled via the I/O of an independent controller (e.g., a personal computer) for ease of programmability and implementation of standardized software routines. Due to the programmability of the robotic device 92, however, the robot-based machine 90 is more flexible because it can more easily be adapted to process a variety of structures 10,11.

In order to understand the operation of the robot-based machine 90 only one type of processing is described herein, although it should be understood that a wide variety of construction processes for producing solderable structures 10,11 are possible. The first and/or second table 94,96 include a variety of tools (i.e., devices not shown which can be integrated with the robot 92 to perform specific tasks), heat sinks 12 in sizes up to 6 in.×6 in., film pads (i.e., pads of thermally-activated bonding material 14, pads of two-layered film including a solderable material 16 and a thermally-activated bonding material, and/or a three-layered film including a dielectric material 18 sandwiched between two layers of thermally-activated bonding material 14), and pads of solderable material 16. The robotic device 92 is equipped with a tool changer (not shown) at its working end 102 which can adapt the various tools on either table 94,96 for control through the robotic device 92.

The robotic device 92 takes a heat sink 12 from one table 94,96 and places it on the platform 100. A heater (e.g., one or more electrical cartridge heaters) in or near the platform 100 maintains the temperature of the platform 100 well above the glass transition temperature of the thermally-activated bonding material 14. After a predetermined interval, the temperature of the heat sink 12 increases above the glass transition temperature of the thermally-activated bonding material 14. If the structure 10 to be fabricated does not require electrical isolation, the robot 92 retrieves a pad (not shown) of two-layered film 66 of solderable material 16 (e.g., copper foil) coated with a layer of thermally-activated bonding material 14 (e.g., thermoplastic polyimide) from the table 94,96 and tack bonds it to the heat sink 12 in a predetermined position. If the structure 11 to be fabricated requires electrical isolation, the robot 92 instead retrieves a pad of three-layered film 66 of dielectric material 18 (e.g., Kapton MT) sandwiched between two layers of thermally-activated bonding material 14 (e.g., thermoplastic polyimide) and tack bonds it to the heat sink 12 in a predetermined position. The robot 92 then picks up a pad of solderable material 16 from either table 94,96 and tack bonds it to the exposed surface of the three-layered film pad.

The structure 10,11 undergoes a pressing step using a drawer type press 98. The temperature of the heat sink 12 is elevated well above the glass transition temperature (e.g., 175–245° C.) of the thermally-activated bonding material 14 before the pressing commences. The press head (not shown) passes out through the press window 104 and then down onto the solderable material 16 to ensure a quality bond with no air entrapped between the heat sink 12 and the solderable material 16. The press head then withdraws vertically before withdrawing horizontally back into the press 98 through window 104. The completed structure 10,11 is then removed from the platform 100 and placed in a collection area (not shown) on one of the tables 94,96.

Figure 10:
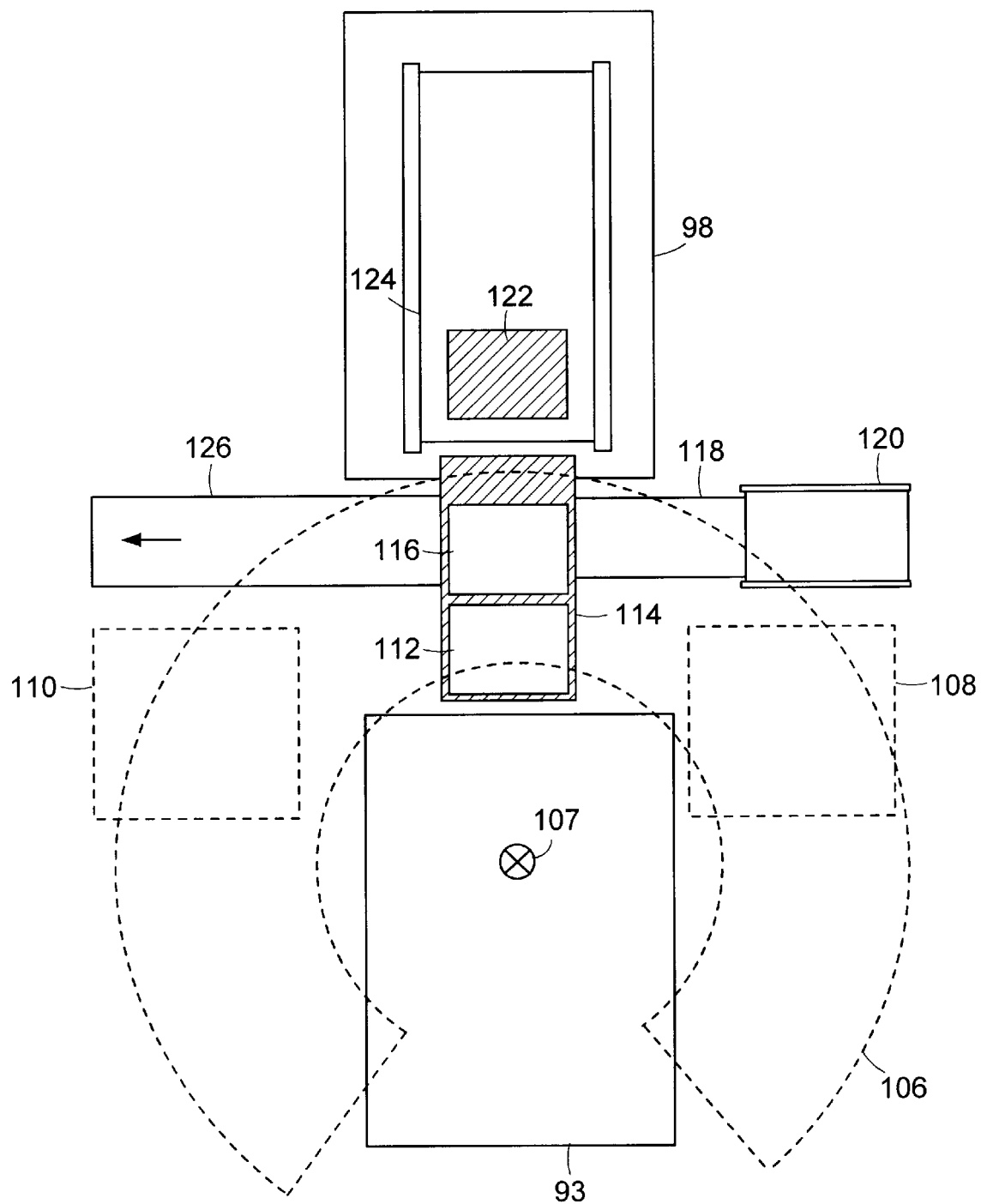
FIG. 10 is a plan view of the robot-based machine of FIG. 9.

FIG. 10 shows a top view of the robotic-based machine 90 in FIG. 9, and indicates one possible configuration of components used in production of the solderable structure 10,11. The robotic device 92 has an access area 106 centered on the robot axis of rotation 107 in which it can place or retrieve components used in the structure 10,11 (e.g., heat sinks 12 or pads of solderable material 16) or tools. For example, heat sinks 12 can be stacked in a substrate area 108 and pads of layer material 14 or 16 can be kept in a layup area 110. The platform 100 is in a load position 112 when it receives a heat sink 12. The platform is then moved along guides 114 into the processing position 116 by a translation device (e.g., an air cylinder (not shown)). A film 118 which can include the thermally-activated bonding material 14, dielectric material 18, and/or solderable material 16 is supplied from a film reel by a film feeder (not shown). The film 118 is cut or punched in or near the processing area 116 by customized tools (not shown) operated by the robot 92 to generate the desired size pad which is then placed on the heat sink 12. Solderable devices 22 can be retrieved from the regions of either table 94,96 that are included in the robot access area 106 and tack bonded to the structure 10,11.

The resulting structure 10,11 is compressed using a drawer press 98. The drawer press 98 includes a press head 122 that translates horizontally in a drawer unit 124 to a stationary position where the press head 122 is directly over the processing position 116. The press head 122 then lowers onto the structure 10,11 and compresses it, thereby forcing out entrapped air and ensuring a quality bond. After the pressing step is completed, the press head 122 withdraws vertically from the structure 10,11 and retracts into the main press assembly 98 via the drawer 124. The completed structure 10,11 is then removed from the platform 100 and placed on a conveyor 126 for transport to another location for collection or further processing such as soldering of a device 22 to the solderable material 16.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for creating a solderable structure, comprising:
   (A) providing a heat sink, a solderable material, and a thermally-activated bonding material, the bonding material comprising polyimide disposed between two layers of thermoplastic polyimide;
   (B) applying heat to the heat sink to raise its temperature; and
   (C) after step (B), disposing the solderable material onto the heated heat sink with the bonding material interposed between the heated heat sink and the solderable material.

2. The method of claim 1 further comprising, after step (C), pressing the solderable material and the heat sink together with the bonding material interposed to create the solderable structure in which the bonding material bonds the solderable material to the heat sink.

3. The method of claim 2 wherein the pressing step includes applying heat while pressing the solderable material and the heat sink together with the bonding material interposed.

4. The method of claim 3 further comprising, after the pressing step, soldering a power semiconductor device to the solderable material.

5. The method of claim 1 wherein step (A) comprises providing the bonding material as a coating on the solderable material.

6. The method of claim 5 wherein step (A) comprises providing the heat sink which comprises aluminum and providing the coated solderable material which comprises copper coated with the bonding material.

7. The method of claim 1 wherein step (A) comprises providing the heat sink which is unsolderable.

8. The method of claim 1 wherein step (A) comprises providing the heat sink which comprises aluminum treated to prevent oxidation.

9. The method of claim 1 wherein step (C) comprises, after step (B), placing the solderable material in a predetermined orientation onto the heated heat sink with the bonding material interposed.

10. The method of claim 1 wherein step (A) comprises providing the bonding material which is thermally-conductive such that heat can dissipate from the solderable material to the heat sink.

11. The method of claim 1 wherein step (A) comprises providing the bonding material which is electrically isolating and thermally-conductive such that heat but not electrical current can flow from the solderable material to the heat sink.

12. A method for creating a solderable structure, comprising:
   (A) providing a heat sink, a solderable material, and a thermally-activated bonding material;
   (B) applying heat to the heat sink to raise its temperature; and
   (C) disposing the solderable material onto the heated heat sink with the bonding material interposed between the heated heat sink and the solderable material.

13. The method of claim 12 further comprising, after step (C), pressing the solderable material and the heat sink together with the bonding material interposed to create the solderable structure in which the bonding material bonds the solderable material to the heat sink.

14. The method of claim 13 wherein the pressing step includes applying heat while pressing the solderable material and the heat sink together with the bonding material interposed.

15. The method of claim 14 further comprising, after the pressing step, soldering a power semiconductor device to the solderable material.

16. The method of claim 12 wherein step (A) comprises providing the bonding material as a coating on the solderable material.

17. The method of claim 16 wherein step (A) comprises providing the heat sink which comprises aluminum and providing the coated solderable material which comprises copper coated with thermoplastic polyimide.

18. The method of claim 12 wherein step (A) comprises providing the heat sink which is unsolderable.

19. The method of claim 12 wherein step (A) comprises providing the heat sink which comprises aluminum treated to prevent oxidation.

20. The method of claim 12 wherein step (C) comprises placing the solderable material in a predetermined orientation onto the heated heat sink with the bonding material interposed.

21. The method of claim 12 wherein step (A) comprises providing the bonding material which is thermally-conductive such that heat can dissipate from the solderable material to the heat sink.

22. The method of claim 12 wherein step (A) further comprises providing a bonding film which comprises a dielectric material disposed between two layers of the bonding material.

23. The method of claim 12 wherein step (C) comprises disposing the solderable material onto the heated heat sink with the bonding film interposed between the heated heat sink and the solderable material.

24. The method of claim 13 further comprising, after step (C), pressing the solderable material and the heat sink together with the bonding film interposed to create the solderable structure in which the bonding film bonds the solderable material to the heat sink.

25. The method of claim 24 wherein the pressing step includes applying heat while pressing the solderable material and the heat sink together with the bonding film interposed.

26. The method of claim 25 further comprising, after the pressing step, soldering a power semiconductor device to the solderable material.

27. The method of claim 22 wherein step (A) comprises providing the bonding film as a three-layer film on the solderable material.

28. The method of claim 22 wherein step (A) comprises providing the heat sink which comprises aluminum and providing the filmed solderable material which comprises copper having thereon the three-layer film which comprises polyimide disposed between two layers of thermoplastic polyimide.

29. The method of claim 22 wherein step (A) comprises providing the heat sink which is unsolderable.

30. The method of claim 22 wherein step (A) comprises providing the heat sink which comprises aluminum treated to prevent oxidation.

31. The method of claim 22 wherein step (C) comprises placing the solderable material in a predetermined orientation onto the heated heat sink with the bonding film interposed.

32. The method of claim 22 wherein step (A) comprises providing the bonding film which is electrically isolating and thermally-conductive such that heat but not electrical current can flow from the solderable material to the heat sink.

* * * * *